United States Patent
Mittal et al.

(10) Patent No.: US 12,315,496 B2
(45) Date of Patent: May 27, 2025

(54) ONTOLOGY DRIVEN CONTEXTUAL AUTOMATED SPEECH RECOGNITION

(71) Applicant: International Business Machines Corporation, Armonk, NY (US)

(72) Inventors: Ashish R. Mittal, Bengaluru (IN);
Samarth Bharadwaj, Bangalore (IN);
Shreya Khare, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 17/735,300

(22) Filed: May 3, 2022

(65) Prior Publication Data
US 2023/0360643 A1 Nov. 9, 2023

(51) Int. Cl.
G10L 15/16 (2006.01)
G10L 13/02 (2013.01)
(Continued)

(52) U.S. Cl.
CPC .............. *G10L 15/16* (2013.01); *G10L 13/02* (2013.01); *G10L 15/1815* (2013.01); *G10L 15/32* (2013.01)

(58) Field of Classification Search
CPC ...... G06F 40/30; G06F 18/2113; G06F 40/20; G06F 3/167; G06F 40/35; G06F 16/687;
(Continued)

(56) References Cited

U.S. PATENT DOCUMENTS 10,049,668 B2 * 8/2018 Huang ................. G10L 15/285
10,304,444 B2 * 5/2019 Mathias ................ G10L 15/22
(Continued)

FOREIGN PATENT DOCUMENTS

EP          3948849 A1    2/2022
WO    WO2020/226948 A1   11/2020
WO    WO2021/113443 A1    6/2021

OTHER PUBLICATIONS

"What is Automatic Speech Recognition?", Docsoft, Inc., Jun. 2009, 3 pages.
(Continued)

*Primary Examiner* — Abdelali Serrou
(74) *Attorney, Agent, or Firm* — Harrity & Harrity, LLP

(57) ABSTRACT

An automatic speech recognition (ASR) computing system and methodology are provided to predict a textual representation of received input speech data. A context acoustic biasing (CAB) engine of the ASR computing system receives historical textual content and an ontology data structure. The CAB engine matches key terms identified in the historical textual content with concepts present in the ontology data structure to generate a contextual term list data structure comprising the concept terms related to concepts matching the key terms. The CAB engine generates acoustic representations of the concept terms in the contextual term list data structure and inputs them to an ASR computer model of the ASR computing system which processes an input speech signal to generate a predicted textual representation of the input speech signal. The predicted textual representation is biased towards the acoustic representations of the concept terms in the contextual term list data structure.

20 Claims, 9 Drawing Sheets

(51) Int. Cl.
*G10L 15/18* (2013.01)
*G10L 15/32* (2013.01)

(58) Field of Classification Search
CPC .. G06F 16/90332; G06F 16/909; G06F 3/162; G06F 40/247; G06F 40/284; G06F 40/295; G06F 40/56; G10L 15/16; G10L 15/063; G10L 15/183; G10L 15/22; G10L 15/32; G10L 15/26; G10L 15/02; G10L 15/193; G10L 2015/025; G10L 15/187; G10L 2015/228; G10L 15/1815; G10L 25/30; G10L 15/083; G10L 15/285; G10L 15/30; G10L 2015/0631; G10L 15/1822; G10L 15/06; G10L 2015/223; G10L 2015/085; G10L 2015/088; G10L 15/197; G10L 15/18; G10L 13/027; G10L 15/08; G10L 15/10; G10L 15/14; G10L 15/19; G10L 17/00; G10L 2015/226; G10L 2015/227; G10L 13/02; G10L 15/144; G10L 19/04; G10L 13/00; G10L 13/06; G10L 13/08; G10L 15/05; G10L 15/065; G10L 15/07; G10L 15/075; G10L 15/20; G10L 17/04; G10L 17/18; G10L 2015/0638; G10L 25/51

See application file for complete search history.

(56) References Cited

U.S. PATENT DOCUMENTS

| | | | | |
|---|---|---|---|---|
| 10,540,957 | B2* | 1/2020 | Hannun | G10L 15/063 |
| 11,270,687 | B2 | 3/2022 | Hu et al. | |
| 11,705,113 | B2* | 7/2023 | Jacob | G06F 16/90332 |
| | | | | 704/200 |
| 12,002,451 | B1* | 6/2024 | Liu | G10L 15/005 |
| 12,051,407 | B2* | 7/2024 | Prabhavalkar | G06N 3/045 |
| 2018/0293221 | A1* | 10/2018 | Finkelstein | G10L 15/22 |
| 2019/0332680 | A1* | 10/2019 | Wang | G10L 15/07 |
| 2019/0340202 | A1* | 11/2019 | Kandur Raja | G06F 40/274 |
| 2020/0027445 | A1* | 1/2020 | Raghunathan | G10L 15/32 |
| 2020/0349923 | A1 | 11/2020 | Hu et al. | |
| 2020/0357388 | A1 | 11/2020 | Zhao et al. | |
| 2023/0335125 | A1* | 10/2023 | Velikovich | G06F 40/166 |

OTHER PUBLICATIONS

Anantaram, C. et al., "Repairing ASR output by Artificial Development and Ontology based Learning", Proceedings of the Twenty-Seventh International Joint Conference on Artificial Intelligence (IJCAI-18), Jul. 13-19, 2018, 3 pages.

Graves, Alex, "Sequence Transduction with Recurrent Neural Networks", arXiv:1211.3711v1 [cs.NE] Nov. 14, 2012, 9 pages.

Guo, Dongyue et al., "A Context-Aware Language Model to Improve the Speech Recognition in Air Traffic Control", Aerospace 2021, 8, 348. https://doi.org/10.3390/aerospace8110348, Nov. 2021, 13 pages.

Hall, Keith et al., "Composition-based on-the-fly rescoring for salient n-gram biasing", https://static.googleusercontent.com/media/research.google.com/en//pubs/archive/43816.pdf, Jun. 2018, 5 pages.

Han, Minglun et al., "Improving End-to-End Contextual Speech Recognition With Fine-Grained Contextual Knowledge Selection", arXiv:2201.12806v2 [cs.CL] Mar. 2, 2022, 5 pages.

Huber, Christian et al., "Instant One-Shot Word-Learning for Context-Specific Neural Sequence-to-Sequence Speech Recognition", arXiv:2107.02268v1 [cs.CL] Jul. 5, 2021, 7 pages.

Jain, Mahaveer et al., "Contextual RNN-T for Open Domain ASR", arXiv:2006.03411v2 [eess.AS] Aug. 12, 2020, 5 pages.

Ko, Wei-Jen et al., "Recurrent Neural Network Based Language Modeling With Controllable External Memory", 2017 IEEE International Conference on Acoustics, Speech and Signal Processing (ICASSP), Mar. 2017, 5 pages.

Lugosch, Logan, "Sequence-to-sequence learning with Tranducers", https://lorenlugosch.github.io/posts/2020/11/transducer/#:~:text=The%20Transducer%20(sometimes%20called%20the,Transduction%20with%20Recurrent%20Neural%20Networks%E2%80%9D. Nov. 16, 2020, 12 pages.

Mrksic, Nikola, "Data-Driven Language Understanding for Spoken Dialogue Systems", Department of Engineering University of Cambridge, Jun. 2018, 150 pages.

Pundak, Golan et al., "Deep Context: End-to-End Contextual Speech Recognition", arXiv:1808.02480v1 [eess.AS] Aug. 7, 2018, 8 pages.

Punjabi, Surabhi et al., "Joint ASR and Language Identification Using RNN-T: an Efficient Approach to Dynamic Language Switching", https://assets.amazon.science/13/73/af2e3c504c9ca787e1604ed9b687/joint-asr-and-language-identification-using-rnn-t-an-efficient-approach-to-dynamic-language-switching.pdf, May 2021, 5 pages.

* cited by examiner

ONTOLOGY DRIVEN CONTEXTUAL AUTOMATED SPEECH RECOGNITION

BACKGROUND

The present application relates generally to an improved computing tool and improved computing tool operations for performing automated speech recognition, and more specifically to mechanisms for providing an ontology driven contextual automated speech recognition.

Automated speech recognition (ASR) refers to computer driven transcription of spoken language into a textual representation in real time. With ASR, computer models, such as neural networks, deep learning neural networks (DNNs), convolutional neural networks (CNNs), recurrent neural networks (RNNs), RNN transducers (RNN-T), and the like, are applied to acoustic features of a spoken input and the acoustic features are translated into a textual representation of the words recognized by the ASR computer models. The goal of the ASR computer system is to recognize, in real-time, with sufficiently high accuracy, the words spoken by a person, regardless of vocabulary size, noise, speaker characteristics or accent, see Yara Rayan, "What is Automatic Speech Recognition?", Docsoft Inc., June 2009.

ASR is a technology that is widely used today in such technologies including smart phones, intelligent speaker devices or assistant devices, and a plethora of other computing devices that receive user speech and attempt to recognize the words spoken by converting the speech to a textual representation. However, the accuracy of such ASR computing systems in recognizing speech is limited due to the training of the computer models used to perform the ASR operations. That is, the accuracy of the operation of the computer models is dependent upon the machine learning training of these computer models which, for higher accuracy, requires a large amount of training data in terms of labeled speech for training an acoustic model of the ASR computer system, and unlabeled text for training a language model of the ASR computer system. However, generating such large training data is a time and resource intensive process. As a result, ASR computing system models are trained on smaller, less than optimal, training data sets which result in less accuracy in the operation of these trained computer models when performing runtime operation, i.e., at inference time. This often results in such ASR computer systems misidentifying the words spoken in the speech input.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in an automatic speech recognition (ASR) computing system, is provided to predict a textual representation of received input speech data. The method comprises receiving, by a context acoustic biasing (CAB) engine of the ASR computing system, historical textual content comprising previously generated embeddings of textual representations for a session associated with the ASR computing system. The method further comprises receiving, by the CAB engine, an ontology data structure, where the ontology data structure comprises a graphical representation of concepts and their related concept terms, and relationships between the concepts. The method also comprises matching, by the CAB engine, key terms identified in the historical textual content with concepts present in the ontology data structure to generate a contextual term list data structure comprising the concept terms related to concepts matching the key terms. In addition, the method comprises generating, by the CAB engine, acoustic representations of the concept terms in the contextual term list data structure. Furthermore, the method comprises inputting, by the CAB engine, the acoustic representations to an automatic speech recognition (ASR) computer model of the ASR computing system, and processing, by the ASR computer model, an input speech signal to generate a predicted textual representation of the input speech signal. The predicted textual representation generated by the ASR computer model is biased towards the acoustic representations of the concept terms in the contextual term list data structure.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
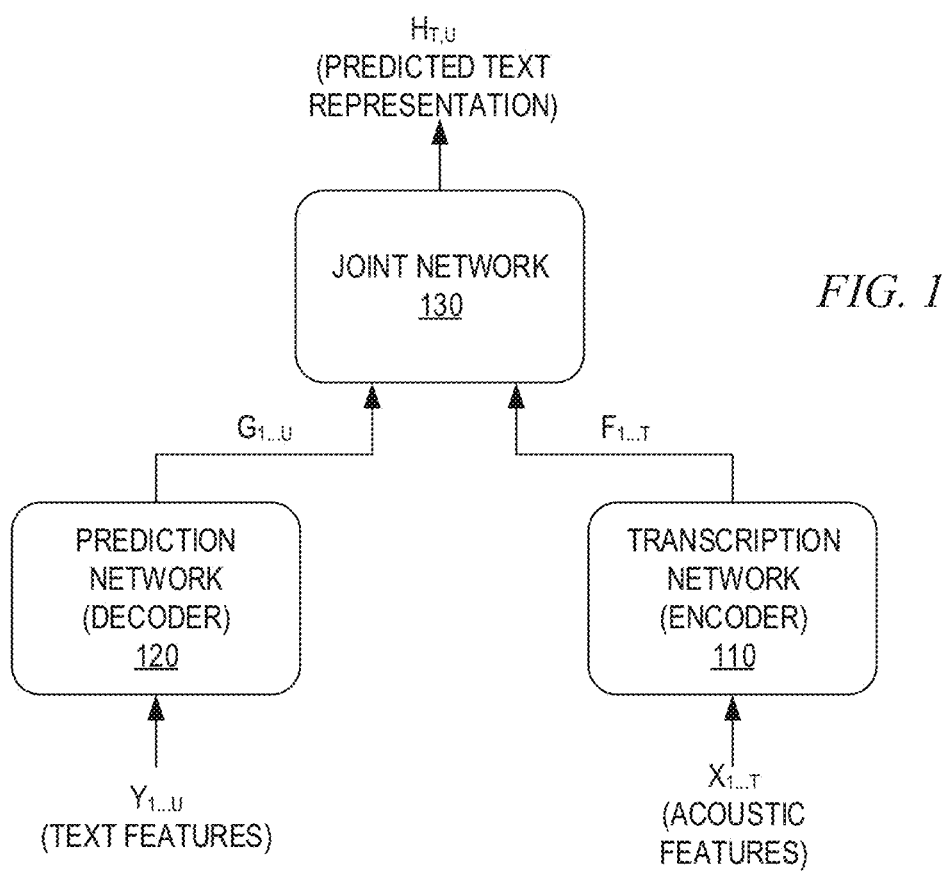
FIG. 1 is an example diagram of an existing automatic speech recognition (ASR) computer system implementing a recurrent neural network transducer (RNN-T) architecture.

The illustrative embodiments provide an improved computing tool and improved computing tool operations specifically designed to improve existing automated speech recognition technology by providing ontology driven contextual automated speech recognition (ASR). The illustrative embodiments provide a contextual phrase miner that uses historical textual content, such as previous decoding in a dialog history, and a domain specific ontology, to identify contextual terms/phrases relevant to the historical textual content. The contextual terms/phrases are then converted, using a text-to-speech engine, to contextual acoustic embeddings, i.e., embeddings representing acoustic features of a synthetically spoken form of the contextual terms/phrases. The contextual acoustic embeddings are used to match to embeddings of audio features of a current speech input, such as may be generated by a transcription neural network of transducer, e.g., a recurrent neural network (RNN) transducer computer model (RNN-T), so as to bias the ASR computing systems' speech-to-text prediction of terms/phrases towards predicting one or more of the contextual terms/phrases. In this way, a more accurate prediction over existing ASR computing systems is achieved when performing the ASR operation and predicting textual representations of the spoken word(s).

As noted above, the illustrative embodiments provide a contextual phrase miner that operates to determine a set, or listing, of contextual terms/phrases corresponding to terms/phrases recognized in historical textual content. To achieve this, the contextual phrase miner of the illustrative embodiments implements graph embeddings, graph matching, graph candidate selection and graph neighborhood expansion engines to generate a contextual term/phrase list based on the historical textual content and its corresponding token embeddings. The graph entity matching engine matches contextual token embeddings to the graph embeddings, which are generated from the domain specific ontology using a graph convolutional neural network, or the like. The graph candidate selection engine finds the affinity of each graph node in the domain specific ontology to the historical textual content and then prunes low scoring candidates. The graph neighborhood expansion engine finds the entities, e.g., terms/phrases, in the neighborhood of selected entities relevant to the historical textual content, which are then output as the entities of the contextual phrase list.

The contextual phrase list, comprising the terms/phrases in the domain specific ontology that are within the neighborhood of terms/phrases previously identified as present in the historical textual content, is processing using text-to-speech (TTS) to generate acoustic embeddings of these terms/phrases which capture acoustic properties of a synthetic speech of these terms/phrases which can be matched to embeddings of currently received actual spoken input. Because the improved computing tool and improved computing tool operation of the illustrative embodiments matches acoustic embeddings, i.e., matching the contextual acoustic embeddings of the terms/phrases in the contextual phrase list with acoustic embeddings of actual received speech input, the mechanisms of the illustrative embodiments generate a higher accuracy than existing ASR computing systems with regard to terms/phrases that are acoustically challenging, i.e., having multiple possible textual representations.

For example, the word "foreclosure", in existing ASR, may be represented as "4 closure", "four closure", "4 close up", or the correct "foreclosure" and it is difficult for the ASR computing system to distinguish which of these is correct since, to the ASR computing system, each is equally possible. Existing ASR systems do not include these rare and hard to distinguish terms/phrases in their training data and thus, they fall back to the most common terms/phrases occurring in the training data set. Thus, "foreclosure", which sounds similar to "four closure", with the terms "four" and "closure" being more frequently represented in the training data set, are chosen by the ASR computing systems to be the predicted textual representation.

The illustrative embodiments operate to bias the ASR computing system to selecting a correct textual transcription of "foreclosure" based on the contextual term list generated from the domain specific ontology and the neighborhood surrounding the previously recognized terms/phrases in the historical textual content using acoustic embedding comparisons and matching. It should be appreciated that the term "matching" as used herein does not mean that an exact match is required, but rather that a probability that one embedding is the same as another embedding is equal to or above a given threshold probability, with the term "probability" being synonymous with the terms "confidence" and "score".

Thus, the improved computing tool and improved computing tool operations provide a domain specific ontology based biasing of the transducer operation using a contextual phrase miner, text-to-speech engine, contextual acoustic embeddings, and an additional attention layer to correlate the contextual acoustic embeddings to current speech embeddings. The illustrative embodiments embed acoustic properties of the contextual terms/phrases identified by the contextual phrase miner, and match these acoustic properties of the contextual terms/phrases with those of the current speech input so as to take into consideration the acoustic properties in determining the most likely textual representation for the spoken input. In this way, the accuracy of the predictions of spoken words is improved over existing art as the predictions are biased to the context of the historical textual content.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of" and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the illustrative embodiments are a specific improvement to the functioning of automatic speech recognition (ASR) computer systems and provide a new functionality in such ASR computer systems that improves the accuracy of the ASR's speech recognition. Thus, the illustrative embodiments are a specific improvement to technology. The specific improvement is specific to ASR technology and is not an abstract concept, but rather a specific improved ASR computer tool and improved ASR computer tool operations. The illustrative embodiments do not set forth a method of organizing human activity, but instead the mechanisms of the illustrative embodiments are specific to ASR computer technology and the mechanisms of the illustrative embodiments are present entirely within one or more computing systems/devices and operate without human intervention other than providing inputs, such as speech input, upon which the mechanisms of the illustrative embodiments may operate. That is, the actual operations of the improved ASR computing tool are not performed by a human being and the present description should not be construed as organizing human activity.

To illustrate the improvements to existing automatic speech recognition (ASR) computer systems provided by the mechanisms of the illustrative embodiments, it should first be understood how existing ASR computer systems take audio and text features corresponding to speech input and train the computer model to predict a textual representation of the speech input. For purposes of illustration, the present description will assume an ASR computer system that is based on a recurrent neural network transducer (RNN-T) architecture, although it should be appreciated that the mechanisms of the illustrative embodiments may be adapted to other ASR computer system architectures without departing from the spirit and scope of the present invention, as will be apparent to those of ordinary skill in the art in view of the present description.

FIG. 1 is an example diagram of an existing automatic speech recognition (ASR) computer system implementing a recurrent neural network transducer (RNN-T) architecture. A RNN-T is a type of sequence-to-sequence transduction model that has three neural networks, or simply "networks". As shown in FIG. 1, these networks include a transcription network or encoder 110, prediction network or decoder 120, and a joint network 130. The transcription network 110 and prediction network 120 may be, for example, recurrent neural networks (RNNs), such as Long Short-Term memory (LSTM) or other deep learning (DL) artificial intelligence neural network mechanism. The transcription network 110 converts an input acoustic feature vector $X_{1 \ldots T}$ to acoustic representations $F_{1 \ldots T}$ for each frame of acoustic input, where a "frame" is a unit of features in automated speech recognition having a corresponding time duration within a time window of the audio or acoustic input, e.g., a frame duration in automated speech recognition may be approximately 10 ms while a window duration may be approximately 25 ms, meaning that the features (text and/or acoustic) are computed for every 10 ms of the audio or acoustic input using a window of 25 ms of data centered around the current frame.

The prediction network 120 is autoregressive in that it takes as an input, the previous outputs of text features $Y_1$ ... $u$, and produces features that can be used to predict the next output, e.g., a textual representation for the predicted term/phrase $G_{1...U}$. It should be appreciated that the value "T" represents the number of frames of audio or acoustic input data and U is the length of the text sequence, e.g., U characters. $Y_i$ refers to the $i^{th}$ term in the sequence. $G_i$ refers to the contextual embedding obtained from the prediction network 120 for the $i^{th}$ ($Y_i$) term (or word). $F_j$ refers to the contextual embedding of the $j^{th}$ frame ($X_j$) after passing through the transcription network 110. $H_{ij}$ refers to the combination of $G_i$ and $F_j$ embeddings after passing through the joint network 130.

The joint network 130, which may be comprised of one or more feed-forward neural networks or the like, combines the contextual embedding for each term (or word) $G_{1...U}$ and the contextual embedding of the acoustic features $F_{1...T}$ to produce a probability distribution for the next output symbol, term, or phrase over a given vocabulary, where this may be a softmax distribution over all the labels (characters, terms, or phrases of a given vocabulary) as well as a null output (blank). That is, the joint network 130 learns the distribution over T×U features over the output vocabulary and a blank character. The training of the neural networks 110-130 of the RNN-T is done by maximizing the log likelihood of the training data input.

Figure 2:
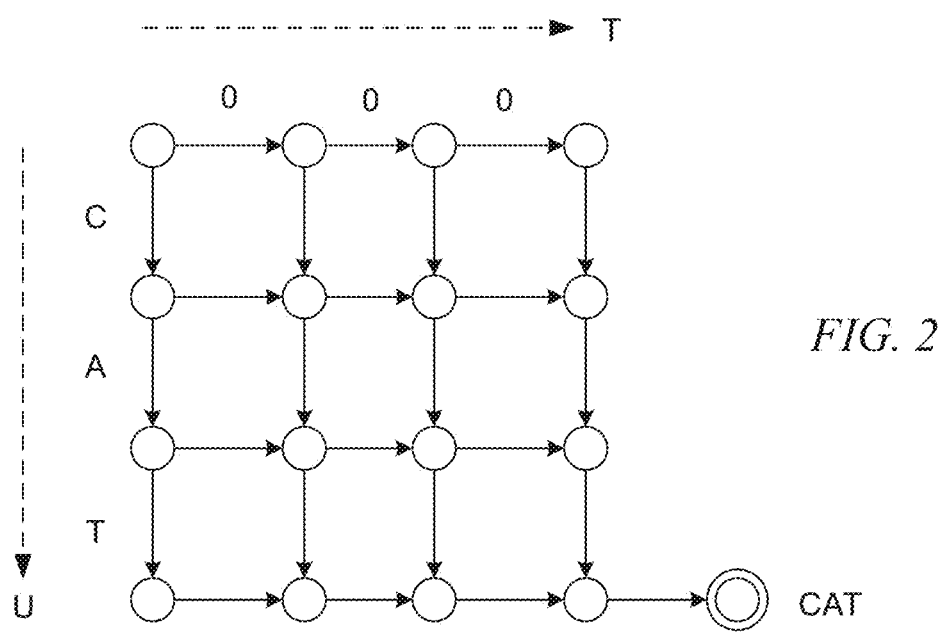
FIG. 2 is a graphical representation of a RNN-T log likelihood computation for training the neural networks of a RNN-T.

FIG. 2 is a graphical representation of a RNN-T log likelihood computation for training the neural networks of a RNN-T (see Loren Lugosch, "Sequence-to-Sequence Learning with Transducers," Nov. 16, 2020, available at https://lorenlugosh.github.io/posts/2020/11/transducer/). The log likelihood computation shown in FIG. 2 is performed using a dynamic programming based forward algorithm which keeps track of previous values. As shown in FIG. 2, for each T×U combination shown in the depicted lattice, there are many possible alignments to compute the exact log-likelihood. That is, in the lattice shown in FIG. 2, for each time step there are two options, either the RNN-T predicts a character, or the RNN-T predicts a blank. If the RNN-T predicts a character, a step down the lattice is performed for the frame and the process continues, e.g., if the top left of the lattice, the RNN-T predicts the character "C", then the process proceeds downward to the next node of the lattice to predict the next character/blank until eventually all of the characters of the word are predicted leaving the remainder of the frame to be blank and causing the word to be output (lower right node), which in this case is the word "CAT". If the RNN-T predicts a blank, there is a move across to the next frame.

While existing RNN-T based ASR computing systems provide a mechanism for recognizing spoken terms/phrases in acoustic speech input, the implicit language model of the RNN-T is biased towards the training data meaning that the RNN-T will predict, with higher probabilities, terms/phrases present in the training data when presented with new speech input. As a result, existing RNN-T based ASR computing systems often fail to recognize new words with sufficient accuracy. The illustrative embodiments of the present invention are built upon the recognition that an ASR computing system, such as an RNN-T based ASR computing system, can benefit from providing a bias word listing to correct these predictions, however it is not sufficient to merely provide a fixed bias word listing, as this may be just as likely to generate incorrect results. To the contrary, a more intelligent mechanism is required to provide context based biasing of the ASR computing system predictions.

While some solutions have been devised for biasing RNN-T based ASR computing system predictions, e.g., Jain et al., "Contextual RNN-T for Open Domain ASR," Interspeech 2020, Oct. 25-29, 2020, these solutions are limited to textual input being provided to bias the RNN-T and do not take into consideration acoustic information when performing the biasing. Contrary to the improved computing tool and improved computing tool operations of the illustrative embodiments as described herein, existing ASR computing systems do not leverage domain specific ontologies for deriving key entities, e.g., terms/phrases, in historical textual content to determine a neighborhood of context based bias entities, e.g., terms/phrases, that may be used to bias predictions performed by the ASR computing system based on the context of the historical textual content. Moreover, existing solutions do not use acoustic embeddings of these context based bias entities to performing matching with acoustic embeddings of received acoustic speech input in order to bias the prediction of the ASR computing system.

Figure 3:
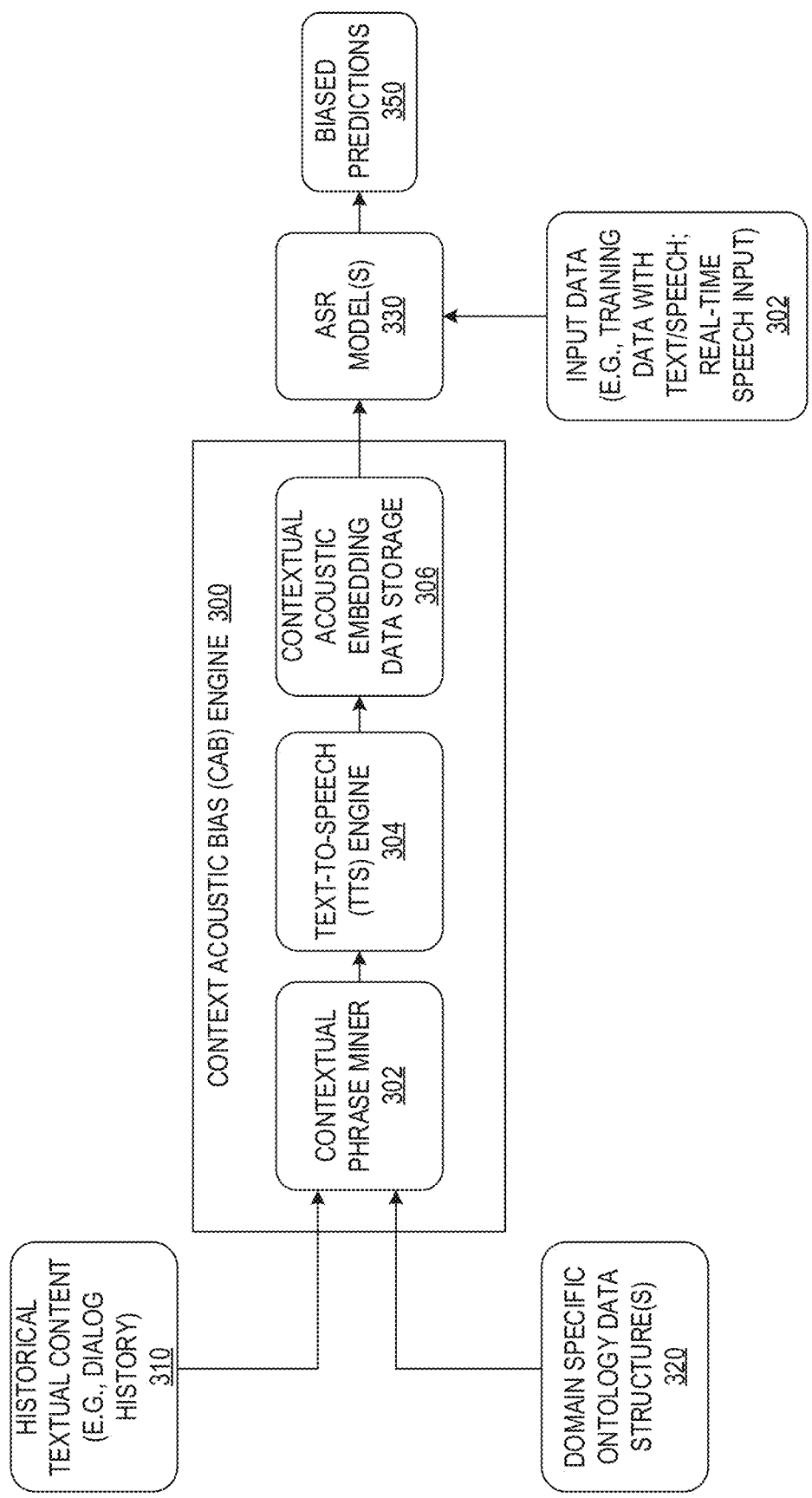
FIG. 3 is an example block diagram of a context acoustic bias engine in accordance with one illustrative embodiment.

FIG. 3 is an example block diagram of a context based acoustic bias engine in accordance with one illustrative embodiment. It should be appreciated that the depiction in FIG. 3, as well as other block diagrams set forth herein, is intended to focus the present description on inventive aspects of the illustrative embodiments and thus, many other underlying components of an ASR computing system may not be explicitly depicted in the figures, but are considered to be present. For example, various computer hardware, computer software, and data structures may be provided in the ASR computing system, but not explicitly shown in the figures, such as operating systems, libraries, data structures, storage devices, data communication interfaces, and the like. The components of the context based acoustic embedding bias augmented ASR computing system shown in FIG. 3 are provided to facilitate the following description of the primary operational components specific to the improved computing tool and improved computing tool operations of the illustrative embodiments.

As shown in FIG. 3, the context acoustic bias (CAB) engine 300 comprises a contextual phrase miner 302, a text-to-speech (TTS) engine 304, and a contextual acoustic embedding data storage 306. The CAB engine 300 receives, as input, the historical textual content 310 from previous decoding of speech input, such as a dialog history. This previous decoding may comprise textual data representing previous decodings by the ASR computing system of acoustic speech input data from prior time points during a session with the ASR computing system. For example, as user provides speech input to the ASR computing system, speech input representing terms, phrases, sentences, and the like, may be decoded into predicted textual representations which are then used as the historical textual content 310 for subsequent speech input during the same session, e.g., a session with a chat bot, a smart speaker, a mobile phone speech recognition tool, or the like, implementing the ASR computing system.

The CAB engine 300 further receives a domain specific ontology data structure 320 as input. The domain specific ontology data structure 320 is a graph data structure comprising nodes (or vertices) representing concepts and their associated textual representations, e.g., terms, phrases, or the like, and edges that connect nodes indicating relationships between the concepts and associated textual representations. In some cases, the domain specific ontology data structure may be a hierarchical graph data structure, a directed acyclic graph (DAG) where the edges have directions indicating the direction of a relationship or dependency, or the like, such that dependencies and relationships between concepts, and thus, their associated textual representations, may be determined. That is, in some illustrative embodiments, a graph convolutional network (GCN) may be applied to the ontology data structure 320 to determine what concepts, and their associated textual representations, are related to one another within a given neighborhood or depth of the ontology graph, e.g., a predetermined number of nodes away from a given node.

Thus, for example, given a recognized concept or term/phrase in the historical textual content 310, the contextual phrase miner 302 is able to identify the corresponding node in the domain specific ontology 320 and identify its associated nodes within a neighborhood of the node corresponding to the given recognized concept or term/phrase. The corresponding terms/phrases of the nodes within this neighborhood may be added to a contextual term/phrase listing data structure by the contextual phrase miner 302.

The terms/phrases in the contextual term/phrase listing data structure may then be input to the TTS engine 304 which takes the textual representations of the terms/phrases in the contextual term/phrase listing data structure and generates a contextual acoustic embedding of these contextual terms/phrases. That is, for each contextual term/phrase, a corresponding acoustic embedding is generated using text-to-speech mechanisms of the TTS engine 304. Text-to-speech algorithms are generally known in the art and thus, a more detailed description is not provided herein. Suffice it to say that the TTS engine 304 applies acoustic features to text to generate acoustic embeddings of the text which represents a type of synthetic speech of the textual representations. One text-to-speech mechanism that may be used to implement the TTS engine 304 is the IBM Watson Text to Speech mechanisms available from International Business Machines (IBM) Corporation of Armonk, New York.

The contextual acoustic embeddings stored in the data storage 306 are provided as input to the ASR computer model 330. The ASR computer model 330 may be a RNN-T computer model 330, for example, or other ASR computer model whose predictions may be biased based on the contextual acoustic embeddings 306 of terms/phrases corresponding to domain specific ontology 320 nodes within a neighborhood of one or more terms/phrases recognized in the historical textual content 310. The ASR computer model 330 uses the contextual acoustic embeddings 306 in its processing of the training data 340, which includes speech input and corresponding text as ground truth labels, to train the ASR computer model 330 through a machine learning process to generate biased predictions 350 of the textual representations of the speech input in the training data 340. That is, the predictions are biased towards the context of the historical textual content 310 and the domain specific ontology 320 taking into account similarity of acoustic features of the contextual acoustic embeddings 306 to acoustic features in the embedding of the speech input of the training data 340, rather than just textual features, to perform the biasing. This provides a more robust matching of the contextual terms/phrases to the acoustic input signals. During runtime operation, or inference time, rather than using training data 340, real-time speech input may be received instead and the trained ASR model 330 will be biased based on the historical textual content of the current session in which the real-time speech input is received. It should be appreciated that while the illustrative embodiments utilize a historical textual content 310 of previously predicted textual content obtained during a current session with the ASR computing system, if a historical textual content 310 does not exist, such as for the first one or more frames of acoustic input, the most common occurring ontology concepts from the domain specific ontology can be utilized instead to perform the biasing until a historical textual content 310 is compiled.

Thus, for example, assume that a user speaks the phrase "Hi, I am looking for some details regarding my home loan" and that the phrase "home loan" is decoded as part of an ASR process. Assuming a financial domain specific ontology data structure 320 is provided, the concept of "home loan" may be associated with a broader concept of "loan" which in turn may be associated with other related concepts including "foreclosure", "eligibility", "interest rate", etc., where these concepts represent potential speech input and corresponding textual representations, i.e., if a user speaks about a "home loan", it is more likely that subsequent speech will include these other concepts. The contextual phrase miner 302 uses graph analysis, such as graph embeddings, graph entity matching, graph candidate selection, and graph neighborhood expansion, to identify the concepts (and their associated terms/phrases) that are within a neighborhood, i.e., predetermined or dynamically determined number of nodes, or depth of nodes, away from or relative to the node in the ontology data structure 320 that corresponds to "home loan", e.g., within 2 "hops" or 2 nodes or 2 edges connected to the "home loan" node. It should be appreciated that any desired value for the number of nodes or depth of nodes may be specified depending on the desired implementation. The terms/phrases of the nodes within this determined neighborhood are added to a contextual term/phrase listing data structure which is then processed by the TTS engine 304 to generate the contextual acoustic embeddings stored in the data storage 306. Thus, for example, acoustic embeddings of the terms "foreclosure", "eligibility", "interest rate", etc., may be generated and input to the ASR engine 330 which matches the acoustic embeddings of these terms with acoustic embeddings of input speech data to bias ASR to these contextual terms/phrases based on the acoustic features of synthetically "spoken" versions of these contextual terms/phrases. As the matching for biasing the predictions generated by the ASR is based on acoustic features and not textual features, the ASR is able to discern differences between closely similar terms/phrases, such as the previously presented example of "4 closure", "four closure", "4 close up", and the correct "foreclosure."

Figure 4:
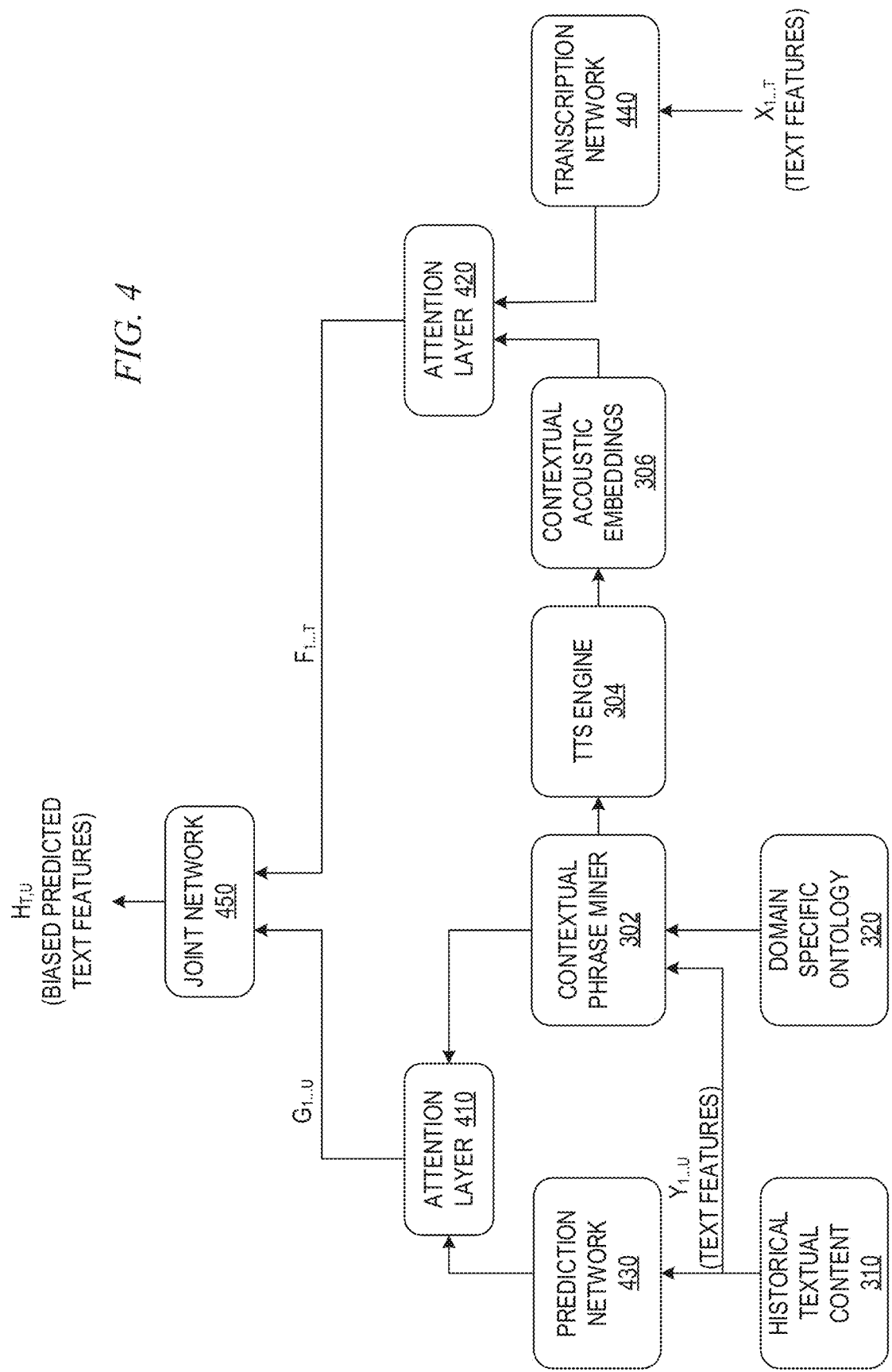
FIG. 4 is an example diagram of a modified RNN-T based ASR computing system implementing the context acoustic bias engine in accordance with one illustrative embodiment.

FIG. 4 is an example diagram of a modified RNN-T based ASR computing system implementing the context acoustic bias engine in accordance with one illustrative embodiment. The modified architecture shown in FIG. 4 may be one implementation of the combination of the CAB engine 300 and the ASR model 330 in FIG. 3. As can be seen by comparing the architecture of FIG. 4 with that of FIG. 1, the modified RNN-T based ASR computing system comprises the contextual phrase miner 302, the input of the domain specific ontology data structure 320, the TTS engine 304, and the contextual acoustic embeddings data storage 306, and two attention layers 410 and 420. The attention layer 410 receives the output of the prediction network 430 of the RNN-T and the contextually relevant terms/phrases determined by the contextual phrase miner 302 from the domain specific ontology 320 and the historical textual content (session history) 310. The attention layer 420 receives the contextual acoustic embeddings from the data storage 306 and the acoustic embeddings from the transcription network 440 as inputs.

The attention layers 410, 420 operate to assess the importance (attend) of each of the terms with respect to the current decoding state. The attention layer 410 focuses the attention of the joint network 450 on the portions of the output from the prediction network 430 that matches the term/phrase embeddings corresponding to the nodes within the neighborhood identified by the contextual phrase miner 302. The attention layer 420 focuses the attention of the joint network 450 on the acoustic features that match the contextual acoustic embeddings from the data storage 306. Thus, the joint network 440 is biased both in the textual features and the acoustic features to the contextually relevant terms/phrases identified from the historical textual content 310 and the domain specific ontology 320. This results in the prediction output $H_{t,u}$ of the joint network 450 generating more accurate predictions of the textual representations of spoken inputs.

During training of the modified RNN-T architecture of FIG. 4, the textual features $Y_{1 \ldots U}$ may be textual labels, e.g., terms/phrases, that correspond to speech input of a training data set that provides the acoustic features $X_{1 \ldots T}$. The RNN-T generates a predicted text $H_{t,u}$ which may then be compared to a ground truth text and the operational parameters of the networks 430-450 modified to reduce a loss function, as is generally known in machine learning training of neural network computer models. Thus, the RNN-T is trained to more accurately identify spoken terms/phrases in speech input that are relevant to the domain specific contexts based on historical textual content.

During runtime operation, also referred to as inference time, the textual features $Y_{1 \ldots U}$ may be the previously decoded text output by the joint network 450 for previously received speech input and represents the historical textual content for the current session with the ASR computing device. The acoustic features $X_{1 \ldots T}$ represents the current speech input for which a predicted textual representation is sought to be output by the ASR computing device. Thus, the RNN-T predicts the textual representation of the current speech input based on the historical textual content 310 for the session with the ASR computing device, and the domain specific ontology 320.

Figure 5:
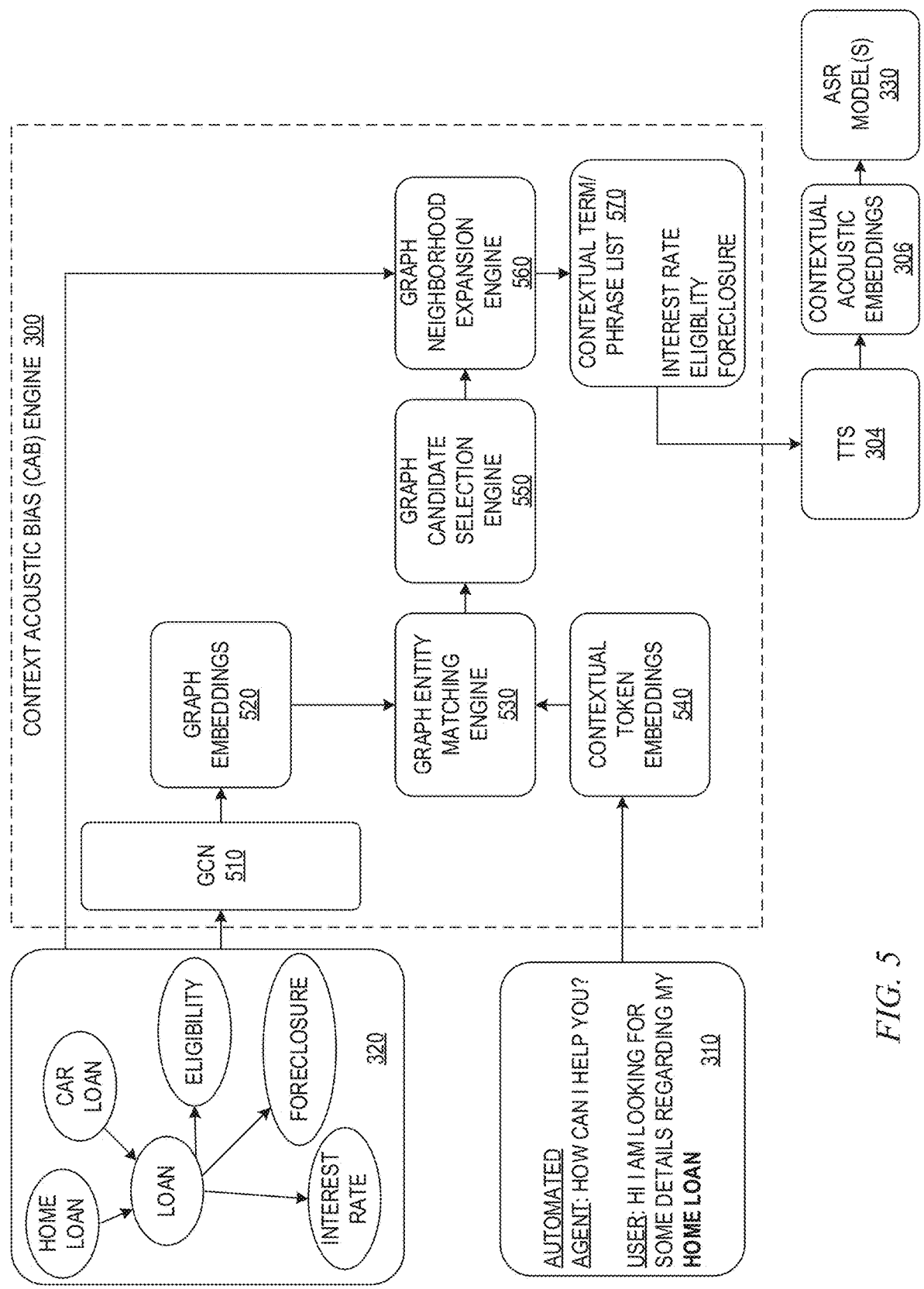
FIG. 5 is an example diagram of the primary operational components of a contextual phrase miner of a context acoustic bias engine in accordance with one illustrative embodiment.

FIG. 5 is an example diagram of the primary operational components of a contextual phrase miner of a context acoustic bias engine in accordance with one illustrative embodiment. As shown in FIG. 5, the contextual phrase miner of the CAB engine comprises a graph convolutional network 510 that generates graph embeddings 520 from an input graph data structure 502, which in the case of the illustrative embodiments is a domain specific ontology data structure, such as the domain specific ontology data structure 320 in FIG. 3. In the depicted example, the domain specific ontology data structure 320 comprises nodes representing financial concepts and associated terms/phrases. The depiction in FIG. 5 shows only a small portion of the domain specific ontology data structure 320 corresponding to a concept of "loan" with two different types of loans being a home loan and a car loan (note edges pointing from the "home loan" node and the "car loan" node to the "loan" node). Other related entities or concepts include nodes for "foreclosure", "eligibility", and "interest rate" meaning that these are concepts that a human being may likely include in their speech input in conjunction with the concept of a loan, which may be a home loan or car loan.

The graph convolutional network (GCN) 510 is a type of convolutional neural network (CNN) that operates directly on graphs and takes advantage of their structural information. For each node in the input graph data structure, e.g., ontology data structure 320, feature information is obtained from all its neighbors and of the node itself and these features, or inputs derived from these features, are fed into a neural network. An embedding. i.e. a relatively low-dimensional space into which the neural network model can translate high dimensional vectors, is then generated for each of the nodes in the graph data structure so as to generate a set of graph embeddings 520.

In addition, historical textual content 310 is processed into contextual token embeddings 540, such as by passing the historical textual content 310 through a pre-trained machine learning natural language processing encoder, such as a BERT or the like, to obtain a sequence/token level representation, referred to as the contextual token embeddings 540, which are input to the graph entity matching engine 530 of the contextual phrase miner 302 along with the graph embeddings 520. The graph entity matching engine 530 performs a matching between the contextual token embeddings 540 for terms/phrases in the input historical textual content 310 and the graph embeddings to thereby identify one or more nodes in the domain specific ontology data structure 320 corresponding to the key terms/phrases present in the contextual token embeddings 540. This matching, as with each "matching" performed by the mechanisms of the illustrative embodiments, does not require an exact match but rather a match within a given tolerance or meeting a threshold requirement. For example, the cosine distance or Euclidean distance between embeddings may be calculated and the "matches" limited to those embeddings that have a distance equal to or less than a threshold, or stated another way a match equal to or greater than a predetermined level of matching. In some cases a top k selection may be performed to select the top k matching embeddings.

The matching results in a set of graph candidates, e.g., nodes and their corresponding terms/phrases, from the domain specific ontology data structure 320 that sufficiently match key terms/phrases found in the historical textual content 310. For example, in the depicted example, the key term "home loan" in the historical textual content 310 will be embedded as contextual token embeddings 540 and these embeddings will be compared to the graph embeddings 520 which results in the node for "home loan" being matched in the domain specific ontology data structure 320 by the graph entity matching engine 530. It is possible that the contextual token embeddings 540 may match multiple different nodes in the domain specific ontology data structure 320 and thus, this matching results in a set of graph candidates 532 which are possible matches to the key terms/phrases found in the historical textual content 310 and embedded as contextual token embeddings 540, e.g., both "home loan" and "loan" may be matched candidate nodes in the domain specific ontology data structure 320. The matching of contextual token embeddings 540 to the graph embeddings 520 so as to select the graph candidates 532 may, in some illustrative embodiments, use self-attention which compares each token in the contextual token embeddings to each other token, including itself, and reweighting the token embeddings of each token based on contextual relevance, thereby taking in n token embeddings without context, and returning n token embeddings with contextual information.

The graph candidates 532 are input to the graph candidate selection engine 550. The graph candidate selection engine 550 finds the affinity of each graph candidate to the historical textual content 310 and then prunes relatively low scoring graph candidates, e.g., takes the top k number of graph candidates or eliminates graph candidates whose scores are below a predetermined threshold level of affinity score. After pruning the graph candidates a subset of graph candidates 552, i.e., nodes in the domain specific ontology data structure 320, is generated that has a required level of affinity with contextual token embeddings 540 obtained from the historical textual content 310. This subset of graph candidates may be considered a set of "pruned graph candidates" 552.

The pruned graph candidates 552 are input to the graph neighborhood expansion engine 560. The graph neighborhood expansion engine 560 operates on the pruned graph candidates 552 and the domain specific ontology data structure 320 to expand the set of nodes, and thus, the set of terms/phrases, based on a neighborhood expansion methodology to find nodes related to the nodes of the pruned graph candidates 552. Again, the number of nodes away from a given node in the ontology data structure to include in the neighborhood, or the depth of the nodes to include in the neighborhood, may be provided as a predetermined value, or hyperparameter. For example, having identified the phrase "home loan" in the historical textual content 310, from the ontology data structure 320, which matches to the "home loan" node, the graph neighborhood expansion engine 560 determines that the related nodes include a super-node (higher level of generality) to which the matched node relates, i.e., "loan", and then the related nodes to this super-node, e.g., "interest rate", "eligibility", and "foreclosure". These related nodes to which the super-node is related may be selected to form nodes and their associated terms/phrases for inclusion in the contextual term/phrase listing data structure 570.

Thus, the resulting expansion of nodes to include nodes in the neighborhood of the matched and pruned nodes of the pruned graph candidates 552 results in a contextual term/phrase listing data structure 570 that comprises the terms/phrases associated with the matched and pruned graph candidate nodes 552 and the nodes within the neighborhood of these matched and pruned graph candidate nodes 552. These terms/phrases are input to the text-to-speech engine 304 which generates acoustic embeddings of these terms/phrases as previously described above so as to generate the contextual acoustic embeddings 306 that are input to the ASR model(s) 330 to bias their predictions towards the terms/phrases corresponding to the historical textual content using acoustic features.

The biasing of the ASR model(s), e.g., the RNN-T used to predict textual representations based on acoustic features of an input speech acoustic signal, improves the operation of the ASR operations by more accurately predicting the speech utterances present in the acoustic features of the input speech acoustic signal. The prediction is made more accurate by biasing the prediction to concepts and their related terms/phrases present in a domain specific ontology data structure and the context of the historical textual content of the session, dialog history, or the like. Moreover, the prediction accuracy is improved because the matching performed is based on acoustic features rather than textual features by converting the terms/phrases most relevant to the context into acoustic feature embeddings that may be matched on an acoustic feature basis with the acoustic feature embeddings generated from the input speech acoustic signal.

It should be appreciated that while FIGS. 3-5 depict a single domain specific ontology data structure being utilized, that is specific to a particular domain of interest, e.g., a financial domain, a medical domain, etc., where the domain may be as specific or as general as desired for the given implementation, the illustrative embodiments are not limited to a single domain specific ontology. To the contrary, the illustrative embodiments may operate on any number of domain specific ontologies without departing from the spirit and scope of the present invention. For example, there may be separate domain specific ontologies provided for different domains. The mechanism of the illustrative embodiments may select a domain specific ontology that is most relevant to the ASR operation based on the key terms/phrases identified in the speech input. That is, for example, if the speech input includes the term "home loan", then a financial domain specific ontology may be selected, whereas if the speech input comprises the term "patient" or "diagnosis", then a medical domain specific ontology may be selected. In some cases, multiple domain specific ontology data structures may be utilized simultaneously with probabilities of matching nodes in the ontologies being used to determine which domain specific ontology is the proper one to utilize when generating neighborhoods and corresponding contextual terms/phrase listings. Any suitable methodology for selecting one or more domain specific ontologies for use in performing the ontology based contextual biasing of the illustrative embodiments may be utilized without departing from the spirit and scope of the present invention.

Figure 6A:
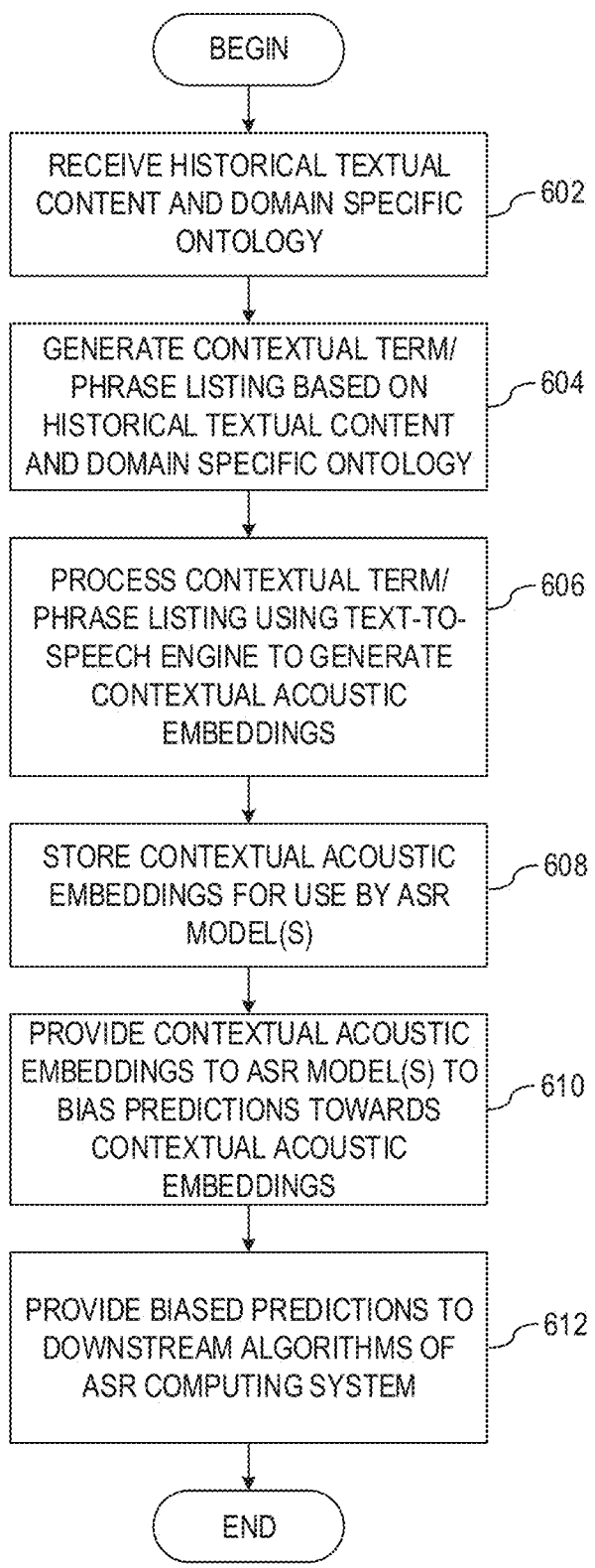
FIG. 6A is a flowchart outlining an example operation of an ASR computer system augmented with the context acoustic bias engine in accordance with one illustrative embodiment.

FIG. 6A is a flowchart outlining an example operation of an ASR computer system augmented with the context acoustic bias (CAB) engine in accordance with one illustrative embodiment. The CAB engine may be the CAB engine 300 of FIG. 3 in which the contextual phrase miner 302, text-to-speech (TTS) engine 304, and a contextual acoustic embedding data storage 306 are provided.

As shown in FIG. 6A, the operation starts by receiving a historical textual content and domain specific ontology data structure as inputs to the CAB engine (step 602). A contextual phrase miner of the CAB engine generates a contextual term/phrase listing based on an embedding of the historical textual content and an embedding of the domain specific ontology data structure by matching token embeddings of the historical textual content with graph embeddings of the domain specific ontology data structure (step 604). The resulting contextual term/phrase listing is then processed by a text-to-speech engine to generate contextual acoustic embeddings (step 606) which are stored in a contextual acoustic embeddings data storage (step 608). The contextual acoustic embeddings are provided to one or more ASR models which biases predictions of textual representations of input speech data to the textual representations of the contextual term/phrase listing based on matching of the contextual acoustic embeddings and embeddings of the speech input (step 610). The biased predictions are then provided as output to the ASR computing system's downstream algorithms for presentation/processing of the textual representations of the speech input, which may take many different forms depending on the desired implementation, e.g., displaying a transcription, inputting the textual representation into other artificial intelligence, cognitive computing, neural networks, or the like, for processing and performance of corresponding further operations (step 612). For example, the textual representations predicted by the ASR model(s) may be output to an automated dialog computing system that uses the textual representations to select automated responses to user speech input. This is one example operation with many others being possible depending on the reason for and application of the ASR functionality in the computing system.

Once the textual representation is predicted by the ASR model(s), the operation with regard to CAB engine in conjunction with the ASR model(s) on the speech input is terminated. However, it should be appreciated that this process may be repeated continuously, periodically, or at any interval desired and in response to any specific triggering condition, e.g., a user speaking and providing a new speech input, a next frame of speech input being processed, etc.

Figure 6B:
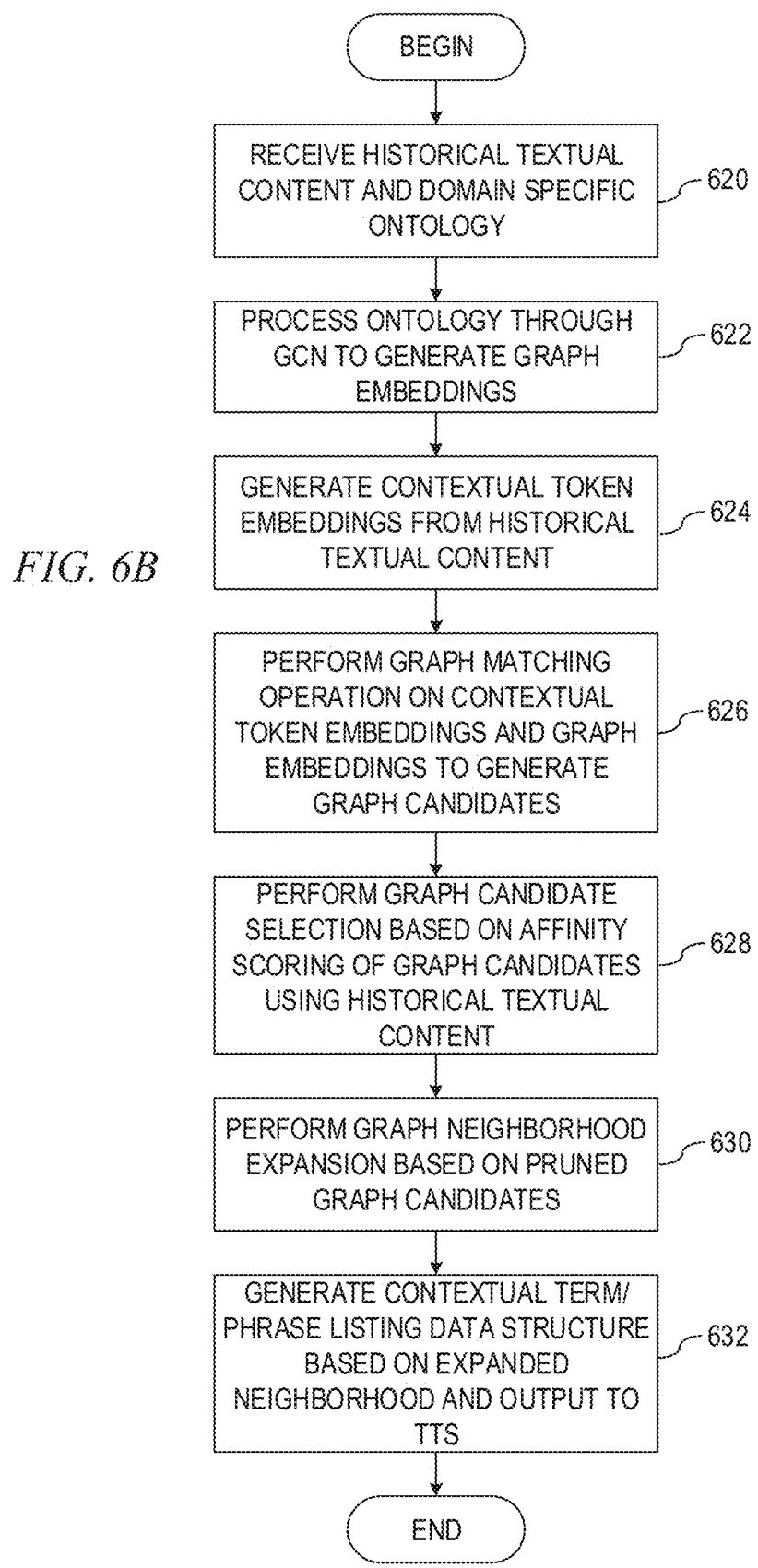
FIG. 6B is a flowchart outlining an example operation of a context phrase miner of a CAB engine in accordance with one illustrative embodiment.

FIG. 6B is a flowchart outlining an example operation of a context phrase miner of a CAB engine in accordance with one illustrative embodiment. As shown in FIG. 6B, the operation starts by receiving a historical textual content and a domain specific ontology data structure as input (step 620). The domain specific ontology data structure is processed via a graph convolutional network to generate graph embeddings (step 622). The historical textual content is processed to generate contextual token embeddings (step 624). A graph matching engine operates on the contextual token embeddings and the graph embeddings to generate graph candidates based on a matching of embeddings to thereby select nodes, and their associated terms/phrases, from the domain specific ontology data structure that correspond to key terms/phrases recognized in the historical textual content (step 626). The graph candidates are input to a graph candidate selection engine that determines an affinity between the graph candidates and the historical textual content and prunes the graph candidates (step 628). The pruned graph candidates are input to a graph neighborhood expansion engine that expands the nodes, and their associated terms/phrases, to nodes within a neighborhood of the pruned graph candidates (step 630). The pruned graph candidates and their neighborhood nodes are then used to generate a contextual term/phrase listing data structure (step 632) which is then output to a text-to-speech engine that generates contextual acoustic embeddings of the terms/phrases in the listing data structure, such as in step 606 of FIG. 6A above. The operation then terminates.

Figure 7:
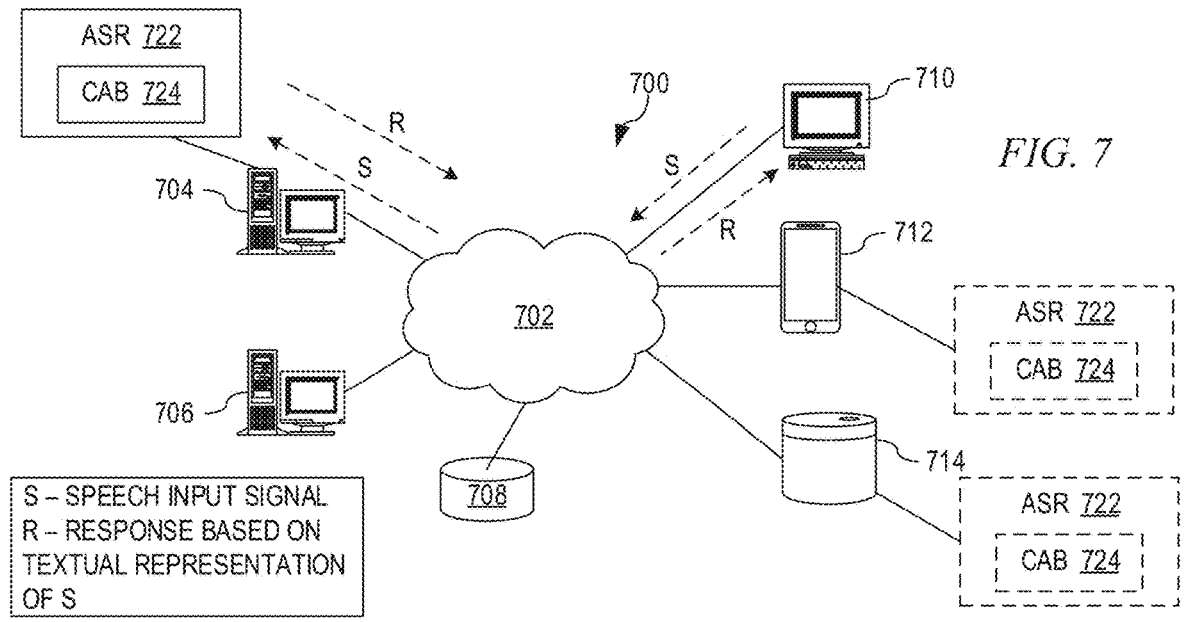
FIG. 7 is an example diagram of a distributed data processing system in which aspects of the illustrative embodiments may be implemented.
Figure 8:
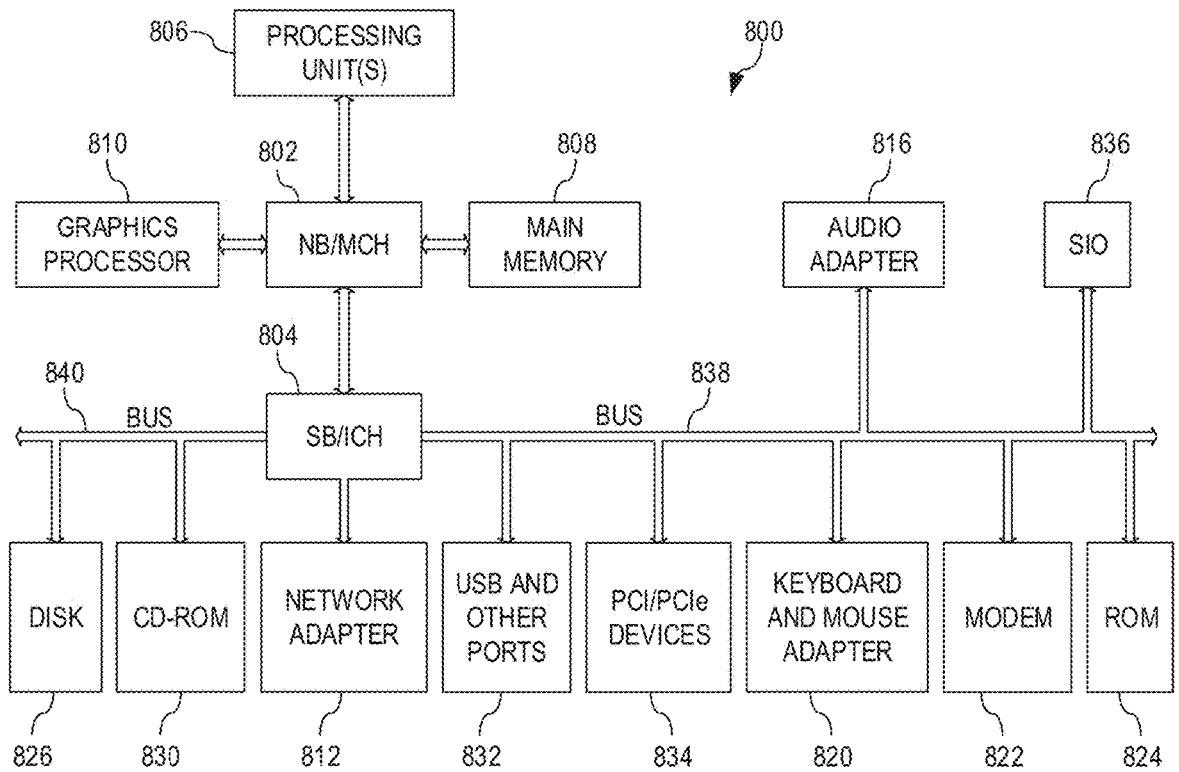
FIG. 8 is an example block diagram of a computing device in which aspects of the illustrative embodiments may be implemented.

From the above description it is apparent that the illustrative embodiments may be utilized in many different types of data processing environments in which Automatic Speech Recognition (ASR) may be implemented and is specifically directed to improving such ASR mechanisms to more accurately predict the textual representation of speech input and thereby recognize what the speaker is speaking about. In order to provide a context for the description of the specific elements and functionality of the illustrative embodiments, FIGS. 7 and 8 are provided hereafter as example environments in which aspects of the illustrative embodiments may be implemented. It should be appreciated that FIGS. 7 and 8 are only examples and are not intended to assert or imply any limitation with regard to the environments in which aspects or embodiments of the present invention may be implemented. Many modifications to the depicted environments may be made without departing from the spirit and scope of the present invention.

FIG. 7 depicts a pictorial representation of an example distributed data processing system in which aspects of the illustrative embodiments may be implemented. Distributed data processing system 700 may include a network of computers in which aspects of the illustrative embodiments may be implemented. The distributed data processing system 700 contains at least one network 702, which is the medium used to provide communication links between various devices and computers connected together within distributed data processing system 700. The network 702 may include connections, such as wire, wireless communication links, or fiber optic cables.

In the depicted example, server 704 and server 706 are connected to network 702 along with storage unit 708. In addition, clients 710, 712, and 714 are also connected to network 702. These clients 710, 712, and 714 may be, for example, personal computers, network computers, or the like. In the depicted example, server 704 provides data, such as boot files, operating system images, and applications to the clients 710, 712, and 714. Clients 710, 712, and 714 are clients to server 704 in the depicted example. Distributed data processing system 700 may include additional servers, clients, and other devices not shown.

In the depicted example, distributed data processing system 700 is the Internet with network 702 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 700 may also be implemented to include a number of different types of networks, such as for example, an intranet, a local area network (LAN), a wide area network (WAN), or the like. As stated above, FIG. 7 is intended as an example, not as an architectural limitation for different embodiments of the present invention, and therefore, the particular elements shown in FIG. 7 should not be considered limiting with regard to the environments in which the illustrative embodiments of the present invention may be implemented.

As shown in FIG. 7, one or more of the computing devices, e.g., server 704, may be specifically configured to implement an automatic speech recognition (ASR) computing system 722 which is augmented with the context acoustic bias (CAB) engine 724 of the illustrative embodiments and which improves the predictions generated by the ASR computing system. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 704, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates an improvement in the functionality of automatic speech recognition (ASR) computing systems by biasing their predictions based on contextual concepts and their related terms/phrases and acoustic embeddings of these contextual concept related terms/phrases, as described previously.

While the CAB augmented ASR computing system 722, 724 may be implemented using one or more server computing devices, such as server 704, the illustrative embodiments are not limited to such. Rather, such ASR mechanisms, and thus, the CAB augmented ASR computing systems 722, 724, may be provided in client computing devices and/or in stand-alone computing devices. For example, the CAB augmented ASR computing system may be part of a client computing device that is a smart speaker device, a mobile smart phone device, a speech recognition component of a desktop or laptop computing device, or any other computing device in which ASR functionality is provided. Regardless of which arrangement of computing devices the CAB augmented ASR functionality is provided in, it should be appreciated that the CAB augmented ASR computing system 722, 724 operates to perform automated speech recognition, where the predictions of textual representations of received speech input, such as may be received via a microphone or other acoustic signal capturing device, are improved by biasing the predictions in accordance with the context acoustic biasing functionality of the CAB engine 724.

As noted above, the mechanisms of the illustrative embodiments utilize specifically configured computing devices, or data processing systems, to perform the operations for context acoustic biasing of ASR predictions. These computing devices, or data processing systems, may comprise various hardware elements which are specifically configured, either through hardware configuration, software configuration, or a combination of hardware and software configuration, to implement one or more of the systems/subsystems described herein. FIG. 8 is a block diagram of just one example data processing system in which aspects of the illustrative embodiments may be implemented. Data processing system 800 is an example of a computer, such as server 704 in FIG. 7, in which computer usable code or instructions implementing the processes and aspects of the illustrative embodiments of the present invention may be located and/or executed so as to achieve the operation, output, and external effects of the illustrative embodiments as described herein.

In the depicted example, data processing system 800 employs a hub architecture including north bridge and memory controller hub (NB/MCH) 802 and south bridge and input/output (I/O) controller hub (SB/ICH) 804. Processing unit 806, main memory 808, and graphics processor 810 are connected to NB/MCH 802. Graphics processor 810 may be connected to NB/MCH 802 through an accelerated graphics port (AGP).

In the depicted example, local area network (LAN) adapter 812 connects to SB/ICH 804. Audio adapter 816, keyboard and mouse adapter 820, modem 822, read only memory (ROM) 824, hard disk drive (HDD) 826, CD-ROM drive 830, universal serial bus (USB) ports and other communication ports 832, and PCI/PCIe devices 834 connect to SB/ICH 804 through bus 838 and bus 840. PCI/PCIe devices may include, for example, Ethernet adapters, add-in cards, and PC cards for notebook computers. PCI uses a card bus controller, while PCIe does not. ROM 824 may be, for example, a flash basic input/output system (BIOS).

HDD 826 and CD-ROM drive 830 connect to SB/ICH 804 through bus 840. HDD 826 and CD-ROM drive 830 may use, for example, an integrated drive electronics (IDE) or serial advanced technology attachment (SATA) interface. Super I/O (SIO) device 836 may be connected to SB/ICH 804.

An operating system runs on processing unit 806. The operating system coordinates and provides control of various components within the data processing system 800 in FIG. 8. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 800.

As a server, data processing system 800 may be, for example, an IBM eServer™ System p® computer system, Power™ processor based computer system, or the like, running the Advanced Interactive Executive (AIX®) operating system or the LINUX® operating system. Data processing system 800 may be a symmetric multiprocessor (SMP) system including a plurality of processors in processing unit 806. Alternatively, a single processor system may be employed.

Instructions for the operating system, the object-oriented programming system, and applications or programs are located on storage devices, such as HDD 826, and may be loaded into main memory 808 for execution by processing unit 806. The processes for illustrative embodiments of the present invention may be performed by processing unit 806 using computer usable program code, which may be located in a memory such as, for example, main memory 808, ROM 824, or in one or more peripheral devices 826 and 830, for example.

A bus system, such as bus 838 or bus 840 as shown in FIG. 8, may be comprised of one or more buses. Of course, the bus system may be implemented using any type of communication fabric or architecture that provides for a transfer of data between different components or devices attached to the fabric or architecture. A communication unit, such as modem 822 or network adapter 812 of FIG. 8, may include one or more devices used to transmit and receive data. A memory may be, for example, main memory 808, ROM 824, or a cache such as found in NB/MCH 802 in FIG. 8.

As mentioned above, in some illustrative embodiments the mechanisms of the illustrative embodiments may be implemented as application specific hardware, firmware, or the like, application software stored in a storage device, such as HDD 826 and loaded into memory, such as main memory 808, for executed by one or more hardware processors, such as processing unit 806, or the like. As such, the computing device shown in FIG. 8 becomes specifically configured to implement the mechanisms of the illustrative embodiments and specifically configured to perform the operations and generate the outputs described herein with regard to the CAB engine augmented ASR computing system 722, 724.

Those of ordinary skill in the art will appreciate that the hardware in FIGS. 7 and 8 may vary depending on the implementation. Other internal hardware or peripheral devices, such as flash memory, equivalent non-volatile memory, or optical disk drives and the like, may be used in addition to or in place of the hardware depicted in FIGS. 7 and 8. Also, the processes of the illustrative embodiments may be applied to a multiprocessor data processing system, other than the SMP system mentioned previously, without departing from the spirit and scope of the present invention.

Moreover, the data processing system 800 may take the form of any of a number of different data processing systems including client computing devices, server computing devices, a tablet computer, laptop computer, telephone or other communication device, a personal digital assistant (PDA), or the like. In some illustrative examples, data processing system 800 may be a portable computing device that is configured with flash memory to provide non-volatile memory for storing operating system files and/or user-generated data, for example. Essentially, data processing system 800 may be any known or later developed data processing system without architectural limitation.

It should also be appreciated that in some illustrative embodiments, the CAB engine augmented ASR computing system may be provided as part of a cloud computing system such that speech input may be received from a source computing device, e.g., a client computing device, and cloud computing resources may be utilized to implement the ASR computing system functionality which is augmented with the CAB engine mechanisms of the illustrative embodiments to perform improved accuracy textual representation predictions of the received speech input. For example, the cloud computing architecture may be used to provide an automated dialog between a user and a chatbot, an automated phone response/dialog system, or any other service in which ASR is utilized.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 9:
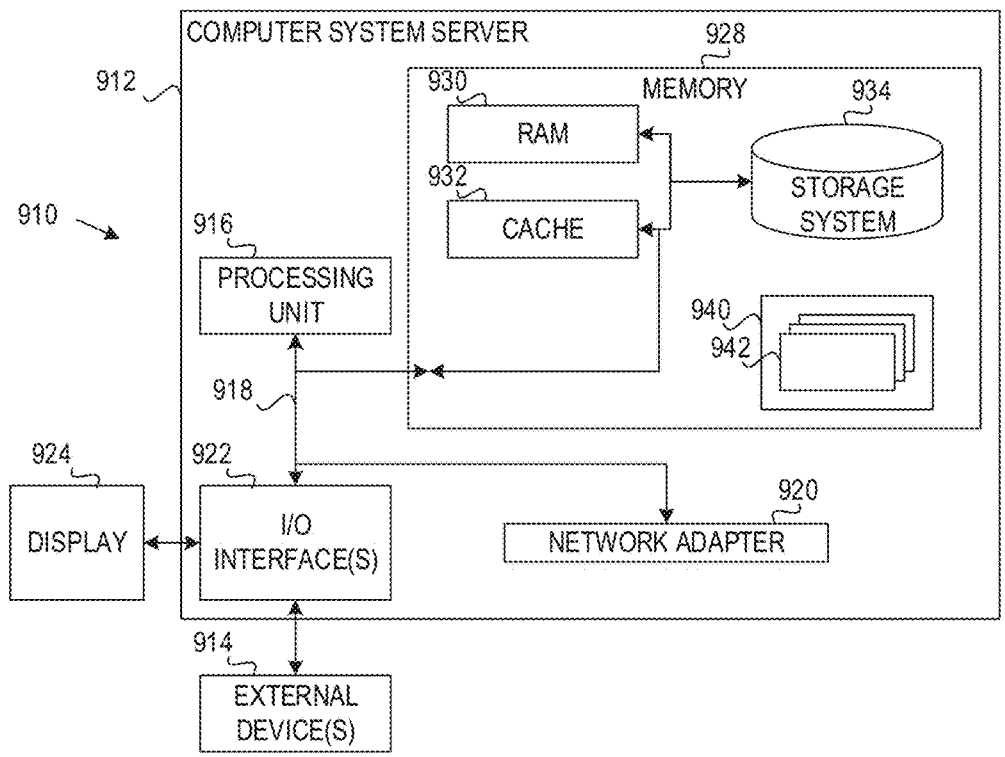
FIG. 9 depicts a cloud computing node according to an illustrative embodiment.

Referring now to FIG. 9, a schematic of an example of a cloud computing node is shown. Cloud computing node 900 is only one example of a suitable cloud computing node and is not intended to suggest any limitation as to the scope of use or functionality of embodiments of the invention described herein. Regardless, cloud computing node 900 is capable of being implemented and/or performing any of the functionality set forth hereinabove.

In cloud computing node 910 there is a computer system/server 912, which is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 912 may be described in the general context of computer system executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 912 in cloud computing node 910 is shown in the form of a general-purpose computing device. The components of computer system/server 912 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 912 typically includes a variety of computer system readable media. Such media may be any available media that is accessible by computer system/server 912, and it includes both volatile and non-volatile media, removable and non-removable media.

System memory 928 can include computer system readable media in the form of volatile memory, such as random access memory (RAM) 930 and/or cache memory 932. Computer system/server 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the invention.

Program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer system/server 912 may also communicate with one or more external devices 914 such as a keyboard, a pointing device, a display 924, etc.; one or more devices that enable a user to interact with computer system/server 912; and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include, but are not limited to: microcode, device drivers, redundant processing units, external disk drive arrays, RAID systems, tape drives, and data archival storage systems, etc.

Figure 10:
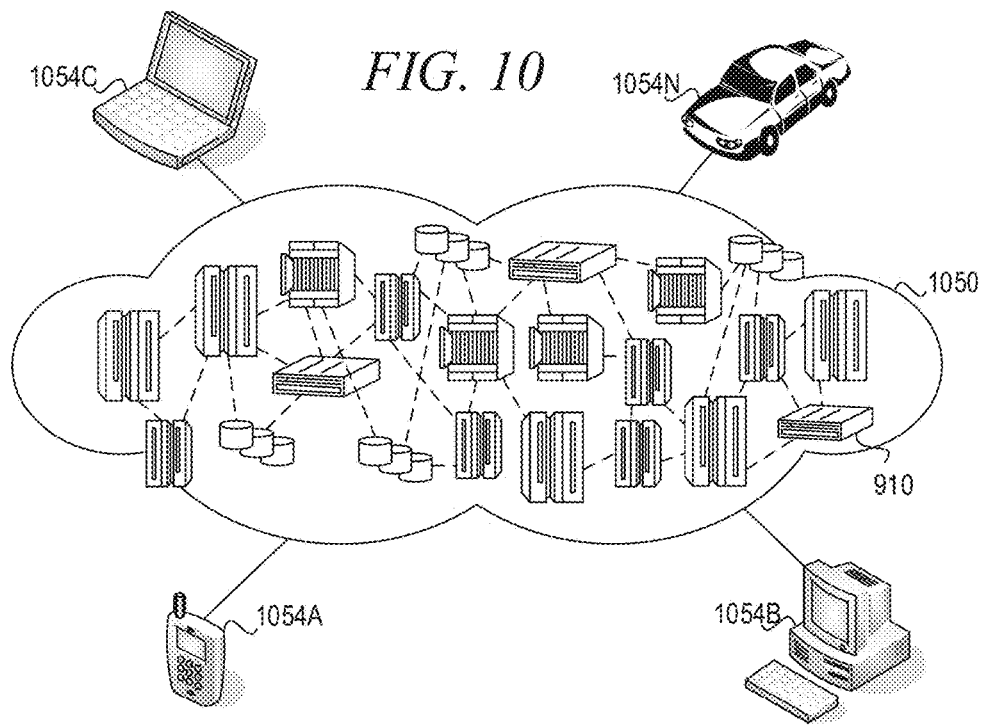
FIG. 10 depicts a cloud computing environment according an illustrative embodiment.

Referring now to FIG. 10, illustrative cloud computing environment 1050 is depicted. As shown, cloud computing environment 50 comprises one or more cloud computing nodes 910 with which local computing devices used by cloud consumers, such as, for example, personal digital assistant (PDA) or cellular telephone 54A, desktop computer 54B, laptop computer 54C, and/or automobile computer system 54N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 910 and cloud computing environment 1050 can communicate with any type of computerized device over any type of network and/or network addressable connection (e.g., using a web browser).

Figure 11:
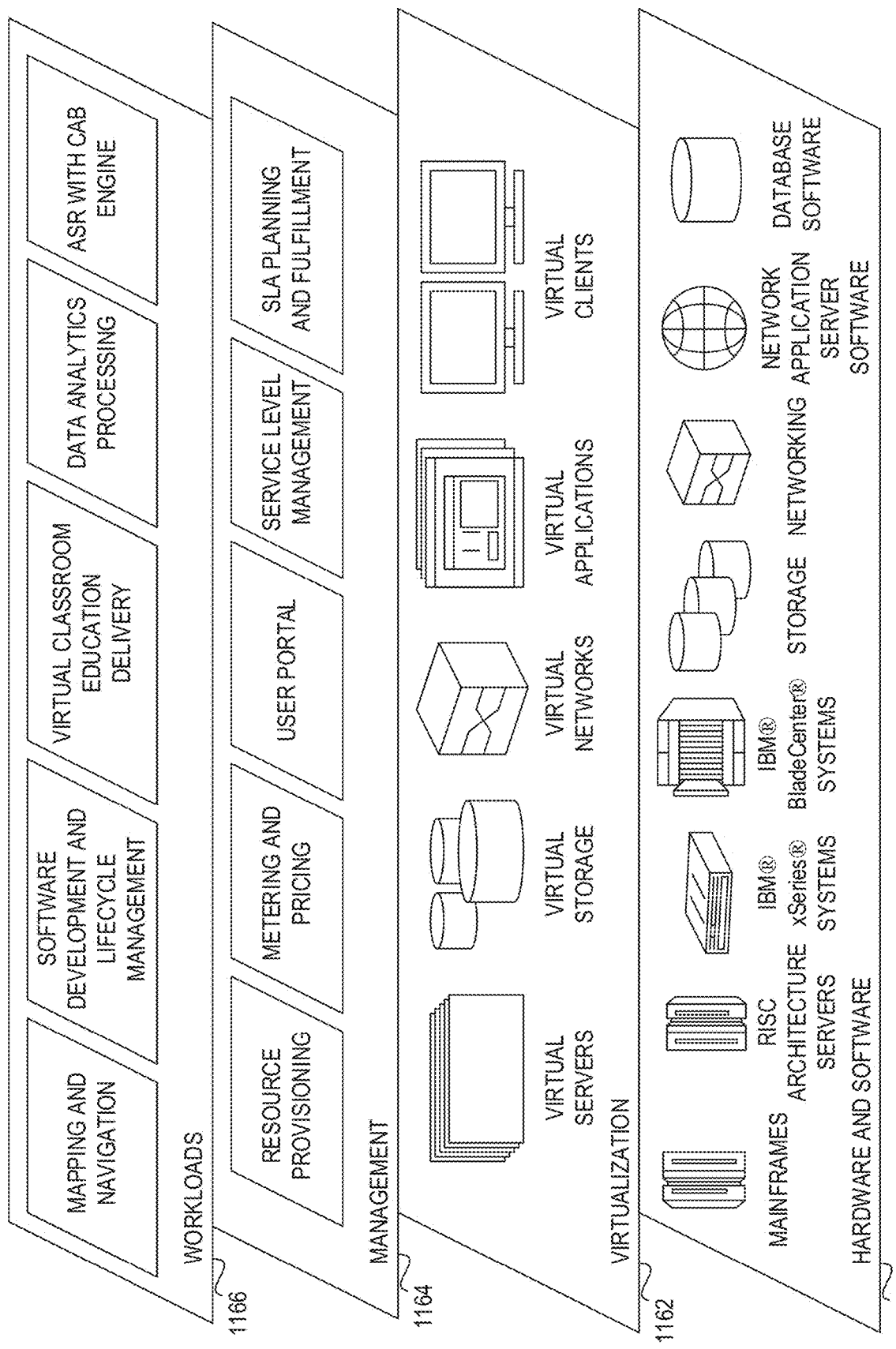
FIG. 11 depicts abstraction model layers according to an illustrative embodiment.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter®, systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1162 provides an abstraction layer from which the following examples of virtual entities may be provided: virtual servers; virtual storage; virtual networks, including virtual private networks; virtual applications and operating systems; and virtual clients.

In one example, management layer 1164 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1166 provides examples of functionality for which the cloud computing environment may be utilized. Examples of workloads and functions which may be provided from this layer include: mapping and navigation; software development and lifecycle management; virtual classroom education delivery; data analytics processing; transaction processing; and automated speech recognition (ASR) augmented with context acoustic biasing (CAB) functionality in accordance with one or more of the above described illustrative embodiments.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless 110 interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in an automatic speech recognition (ASR) computing system, to predict a textual representation of received input speech data, comprising:
    receiving, by a context acoustic biasing (CAB) engine of the ASR computing system, historical textual content comprising previously generated embeddings of textual representations for a session associated with the ASR computing system;
    receiving, by the CAB engine, an ontology data structure, wherein the ontology data structure comprises a graphical representation of concepts and related concept terms, and relationships between the concepts;
    matching, by the CAB engine, key terms identified in the historical textual content with concepts present in the ontology data structure to generate a contextual term list data structure comprising concept terms related to concepts matching the key terms;
    generating, by the CAB engine, acoustic representations of the concept terms;
    inputting, by the CAB engine, the acoustic representations to an ASR computer model of the ASR computing system; and
    processing, by the ASR computer model, an input speech signal to generate a predicted textual representation of the input speech signal, wherein the predicted textual representation generated by the ASR computer model is biased towards the acoustic representations of the concept terms, wherein matching the key terms identified in the historical textual content with the concepts present in the ontology data structure comprises:
    processing, by a graph convolutional neural network (GCN), the ontology data structure to generate graph embeddings;
    retrieving previously generated token embeddings for the historical textual content; and
    performing a graph entity matching operation between graph entities in the ontology data structure and the previously generated token embeddings to generate graph candidates for generating the contextual term list data structure.

2. The method of claim 1, wherein matching the key terms identified in the historical textual content with the concepts present in the ontology data structure further comprises performing a graph candidate selection operation on the graph candidates based on an affinity between the graph candidates and a context of the historical textual content.

3. The method of claim 2, wherein performing the graph candidate selection operation comprises:

calculating, for each graph candidate, an affinity score for the graph candidate; and pruning graph candidates having an affinity score below a threshold affinity score from further consideration.

4. The method of claim 1, wherein matching the key terms identified in the historical textual content with the concepts present in the ontology data structure further comprises:

performing a graph neighborhood expansion operation on the graph candidates to identify concepts, within a neighborhood of the graph candidates, that are related to the graph candidates in the ontology data structure; and adding concept terms corresponding to the concepts within the neighborhood to the contextual term list data structure.

5. The method of claim 1, wherein generating the acoustic representations of the concept terms comprises inputting the concept terms into a text-to-speech engine that applies acoustic models to textual representations of the concept terms to generate corresponding acoustic embeddings.

6. The method of claim 1, wherein inputting the acoustic representations to the ASR computer model comprises inputting the acoustic representations into an attention layer of the ASR computer model to bias the attention layer towards the concept terms based on acoustic features of the acoustic representations.

7. The method of claim 1, wherein the ASR computer model is a recurrent neural network transformer (RNN-T), and the CAB engine inputs the acoustic representations into an attention layer corresponding to a transcription neural network of the RNN-T.

8. The method of claim 1, wherein the ontology data structure is a domain specific ontology data structure that is specific to a domain of the ASR computing system.

9. The method of claim 8, wherein the ontology data structure is one of a plurality of domain specific ontology data structures, each domain specific ontology data structure being specific to a different domain, and wherein the ontology data structure is selected from the plurality of domain specific ontology data structures based on a context of the historical textual content.

10. A computer program product comprising a computer readable storage medium having a computer readable program stored therein, wherein the computer readable program, when executed on a computing device, causes the computing device to be configured to operate as an automatic speech recognition (ASR) computing system that predicts a textual representation of received input speech data, the ASR computing system operating to:

receive, by a context acoustic biasing (CAB) engine of the ASR computing system, historical textual content comprising previously generated embeddings of textual representations for a session associated with the ASR computing system;

receive, by the CAB engine, an ontology data structure, wherein the ontology data structure comprises a graphical representation of concepts and related concept terms, and relationships between the concepts;

match, by the CAB engine, key terms identified in the historical textual content with concepts present in the ontology data structure to generate a contextual term list data structure comprising concept terms related to concepts matching the key terms;

generate, by the CAB engine, acoustic representations of the concept terms;

input, by the CAB engine, the acoustic representations to an ASR computer model of the ASR computing system; and process, by the ASR computer model, an input speech signal to generate a predicted textual representation of the input speech signal, wherein the predicted textual representation generated by the ASR computer model is biased towards the acoustic representations of the concept terms, wherein matching the key terms identified in the historical textual content with the concepts present in the ontology data structure comprises:

processing, by a graph convolutional neural network (GCN), the ontology data structure to generate graph embeddings;

retrieving previously generated token embeddings for the historical textual content; and performing a graph entity matching operation between graph entities in the ontology data structure and the previously generated token embeddings to generate graph candidates for generating the contextual term list data structure.

11. The computer program product of claim 10, wherein matching the key terms identified in the historical textual content with the concepts present in the ontology data structure further comprises performing a graph candidate selection operation on the graph candidates based on an affinity between the graph candidates and a context of the historical textual content.

12. The computer program product of claim 11, wherein performing the graph candidate selection operation comprises:

calculating, for each graph candidate, an affinity score for the graph candidate; and pruning graph candidates having an affinity score below a threshold affinity score from further consideration.

13. The computer program product of claim 10, wherein matching the key terms identified in the historical textual content with the concepts present in the ontology data structure further comprises:

performing a graph neighborhood expansion operation on the graph candidates to identify concepts, within a neighborhood of the graph candidates, that are related to the graph candidates in the ontology data structure; and adding concept terms corresponding to the concepts within the neighborhood to the contextual term list data structure.

14. The computer program product of claim 10, wherein generating the acoustic representations of the concept terms comprises inputting the concept terms into a text-to-speech engine that applies acoustic models to textual representations of the concept terms to generate corresponding acoustic embeddings.

15. The computer program product of claim 10, wherein inputting the acoustic representations to the ASR computer model comprises inputting the acoustic representations into an attention layer of the ASR computer model to bias the attention layer towards the concept terms based on acoustic features of the acoustic representations.

16. The computer program product of claim 10, wherein the ASR computer model is a recurrent neural network transformer (RNN-T), and the CAB engine inputs the acoustic representations into an attention layer corresponding to a transcription neural network of the RNN-T.

17. The computer program product of claim 10, wherein the ontology data structure is a domain specific ontology data structure that is specific to a domain of the ASR computing system.

18. An automatic speech recognition (ASR) computing system comprising:
- at least one processor; and
- at least one memory coupled to the at least one processor, wherein the at least one memory comprises instructions which, when executed by the at least one processor, cause the at least one processor to be configured to operate as an ASR computing system that predicts a textual representation of received input speech data, the ASR computing system operating to:
- receive, by a context acoustic biasing (CAB) engine of the ASR computing system, historical textual content comprising previously generated embeddings of textual representations for a session associated with the ASR computing system;
- receive, by the CAB engine, an ontology data structure, wherein the ontology data structure comprises a graphical representation of concepts and related concept terms, and relationships between the concepts;
- match, by the CAB engine, key terms identified in the historical textual content with concepts present in the ontology data structure to generate a contextual term list data structure comprising concept terms related to concepts matching the key terms;
- generate, by the CAB engine, acoustic representations of the concept terms;
- input, by the CAB engine, the acoustic representations to an ASR computer model of the ASR computing system; and
- process, by the ASR computer model, an input speech signal to generate a predicted textual representation of the input speech signal, wherein the predicted textual representation generated by the ASR computer model is biased towards the acoustic representations of the concept terms, wherein matching the key terms identified in the historical textual content with the concepts present in the ontology data structure comprises:
  - processing, by a graph convolutional neural network (GCN), the ontology data structure to generate graph embeddings;
  - retrieving previously generated token embeddings for the historical textual content; and
  - performing a graph entity matching operation between graph entities in the ontology data structure and the previously generated token embeddings to generate graph candidates for generating the contextual term list data structure.

19. The ASR computing system of claim 18, wherein matching the key terms identified in the historical textual content with the concepts present in the ontology data structure further comprises performing a graph candidate selection operation on the graph candidates based on an affinity between the graph candidates and a context of the historical textual content.

20. The ASR computing system of claim 18, wherein matching the key terms identified in the historical textual content with the concepts present in the ontology data structure further comprises:
- performing a graph neighborhood expansion operation on the graph candidates to identify concepts, within a neighborhood of the graph candidates, that are related to the graph candidates in the ontology data structure; and
- adding concept terms corresponding to the concepts within the neighborhood to the contextual term list data structure.

\* \* \* \* \*